(12) United States Patent
Kansal

(10) Patent No.: US 7,920,717 B2
(45) Date of Patent: Apr. 5, 2011

(54) PIXEL EXTRACTION AND REPLACEMENT

(75) Inventor: Aman Kansal, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 876 days.

(21) Appl. No.: 11/676,994

(22) Filed: Feb. 20, 2007

(65) Prior Publication Data

US 2008/0199095 A1    Aug. 21, 2008

(51) Int. Cl.
   G06K 9/00    (2006.01)
   G06K 9/40    (2006.01)
(52) U.S. Cl. ..................... 382/103; 382/254
(58) Field of Classification Search ............... 382/103
    See application file for complete search history.

(56) References Cited

U.S. PATENT DOCUMENTS

| | | | |
|---|---|---|---|
| 4,979,136 A * | 12/1990 | Weiman et al. | 382/169 |
| 5,748,775 A * | 5/1998 | Tsuchikawa et al. | 382/190 |
| 5,818,975 A * | 10/1998 | Goodwin et al. | 382/274 |
| 5,872,864 A * | 2/1999 | Imade et al. | 382/176 |
| 5,995,660 A * | 11/1999 | Andoh et al. | 382/181 |
| 6,026,232 A | 2/2000 | Yogeshwar et al. | |
| 6,067,399 A | 5/2000 | Berger | |
| 6,509,926 B1 | 1/2003 | Mills et al. | |
| 7,203,357 B2 * | 4/2007 | Teratani et al. | 382/168 |
| 7,574,042 B2 * | 8/2009 | Tsuruoka et al. | 382/169 |
| 7,602,943 B2 * | 10/2009 | Fukui et al. | 382/103 |
| 7,684,483 B2 * | 3/2010 | Coleman | 375/240.01 |
| 2004/0247289 A1 | 12/2004 | Choi | |
| 2005/0129272 A1 | 6/2005 | Rottman | |
| 2005/0180595 A1 | 8/2005 | Horii et al. | |
| 2005/0254686 A1 | 11/2005 | Koizumi | |
| 2005/0270371 A1 | 12/2005 | Sablak | |
| 2006/0007310 A1 | 1/2006 | Shih | |
| 2006/0139484 A1 * | 6/2006 | Seo et al. | 348/373 |

FOREIGN PATENT DOCUMENTS

| | | |
|---|---|---|
| JP | 4362885 A | 12/1992 |
| JP | 9149364 A | 6/1997 |
| JP | 2003230045 A | 8/2003 |
| KR | 20020048574 A | 6/2002 |
| WO | WO9703517 A1 | 1/1997 |
| WO | WO2006070249 A1 | 7/2006 |

OTHER PUBLICATIONS

Fan, et al., "A Novel Approach for Privacy-Preserving Video Sharing", retrieved at <<http://delivery.acm.org/10.1145/1100000/1099711/p609-fan.pdf?key1=1099711&key2=9964236511&coll=GUIDE&dl=GUIDE&CFID=784087&CFTOKEN=12767689>>, CIKM, Oct. 31-Nov. 5, 2005, ACM, 2005, pp. 609-616.

Wickramasuriya, et al., "Privacy Protecting Data Collection in Media Spaces", retrieved at <<http://delivery.acm.org/10.1145/1030000/1027537/p48-wickramasuriya.pdf?key1=1027537&key2=9985236511&coll=GUIDE&dl=GUIDE&CFID=784087&CFTOKEN=12767689>>, MM04, Oct. 10-16, 2004, ACM, 2004, pp. 48-55.

* cited by examiner

*Primary Examiner* — Bhavesh M Mehta
*Assistant Examiner* — Patrick L Edwards
(74) *Attorney, Agent, or Firm* — Lee & Hayes, PLLC

(57) ABSTRACT

A method for pixel extraction and replacement is disclosed. In one implementation, the method includes generating a set of pixel values and pixel value frequencies for a pixel presented in a series of digital images of a scene. A digital image of the scene which includes a pixel value for the pixel is received and a comparison is made between the pixel value and the set of pixel values. A determination is performed to decide upon substitution of the pixel value with a different pixel value based on the comparison. Other techniques are also disclosed.

20 Claims, 13 Drawing Sheets

| Camera Model 604 | Noise Compensation Factor (K) 606 |
|---|---|
| 1 | K1 |
| 2 | K2 |
| 3 | K3 |
| : | : |
| N | KN |

| Light Intensity (I) 608 | Light Compensation Factor (L) 610 |
|---|---|
| I1 | L1 |
| I2 | L2 |
| I3 | L3 |
| : | : |
| IN | LN |

PIXEL EXTRACTION AND REPLACEMENT

BACKGROUND

Webcams are currently being used for sharing views of interest by many people using the Internet. Such views may be in the form of pictures or video and accessible via web pages, email, or other techniques. More generally, a Webcam is a video camera, sometimes referred to as a "cam" (e.g., a homecam, a securitycam, etc.) usually attached directly to a computer, whose current or latest image is accessible from a Web site. A live cam is one that is continually providing new images that are transmitted in rapid succession or, in some cases, in streaming video. Sites with live cams sometimes embed control code in Web pages.

While the first cams were positioned mainly on mundane items like fish tanks and coffee machines, more beneficial commercial uses followed. For example, Webcams now promote travel destinations, provide traffic information, and allow for remote visualization of any ongoing event of interest. In the field of security, so called "securitycams" allow for monitoring environments such as homes, streets, yards, workplaces, ATMs, etc. Further, specialized services to facilitate cam use have been developed. For example, Sensor-Map™ services (Microsoft Corporation, Redmond, Wash.) allow users to post live feeds from their webcams to the Internet for public viewing.

Concomitant with increased use of cams are privacy concerns. For example, a Webcam installed by a user may capture portions in a field of view which the user does not have authority to share with others, or a field of view may have portions which the user does not wish to share.

Various existing techniques for privacy control of data over the Internet rely on encryption and authentication. Encryption prevents unintended viewers from viewing the data during transmission over the Internet or from a storage medium. Authentication provides access to a trusted set of users with methods, such as, requiring a password or using a central service to create a trusted user list, etc. Such existing techniques have some shortcomings. For example, they do not allow a user to provide access to a portion or portions of Webcam data which the user decides to be non-privacy sensitive. As described herein, various exemplary techniques allow a user to apply security controls to a portion or portions of Webcam data.

SUMMARY

This summary is provided to introduce simplified concepts of pixel extraction and replacement which is further described below in the Detailed Description. This summary is not intended to identify essential features of the claimed subject matter, nor is it intended for use in determining the scope of the claimed subject matter.

Exemplary techniques for pixel extraction and replacement are disclosed herein. Various exemplary techniques allow a user to apply security controls to a portion or portions of Webcam data. Various exemplary techniques can apply security controls to a portion of a scene in a manner undetectable to viewer unauthorized to view the portion. Such an exemplary technique can help reduce sharing of privacy sensitive portions of a Webcam stream but still allowing a meaningful view from the Webcam to be shared with the world or trusted agents. Various exemplary techniques may be used in a manner complimentary to encryption and authentication based techniques.

In one implementation, a method includes generating a set of pixel values and pixel value frequencies for a pixel presented in a series of digital images of a scene. A digital image of the scene, which includes a pixel value for the pixel, is received and a comparison is made between the pixel value and the set of pixel values. A determination is performed to decide upon substitution of the pixel value with a different pixel value based on the comparison.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes systems and methods for pixel extraction and replacement. While aspects of described systems and methods for pixel extraction and replacement can be implemented in any number of different computing systems, environments, and/or configurations, embodiments of the systems and methods are described in the context of the following exemplary system architecture(s).

In a typical scenario, it may be desired to mask certain regions or portions of a digital image of a scene. To this end, the disclosed systems and methods enable selective pixel extraction and replacement in the digital image. An output digital image may be generated where a generation process includes masking any non-preferred pixel value and replacing any such non-preferred values with a preferred one. In an implementation, a method includes generating a set of pixel values and pixel value frequencies for a pixel in a series of digital images of a scene. The set represents preferred values of the pixel which would enable masking of non-preferred pixel values in subsequent digital images of the scene. Accordingly, any pixel value in a subsequent digital image, if not belonging to the set, may be substituted by a pixel value belonging to the set. The substituted pixel value, in an embodiment, may be a pixel value having the highest pixel value frequency in the set.

Figure 1:
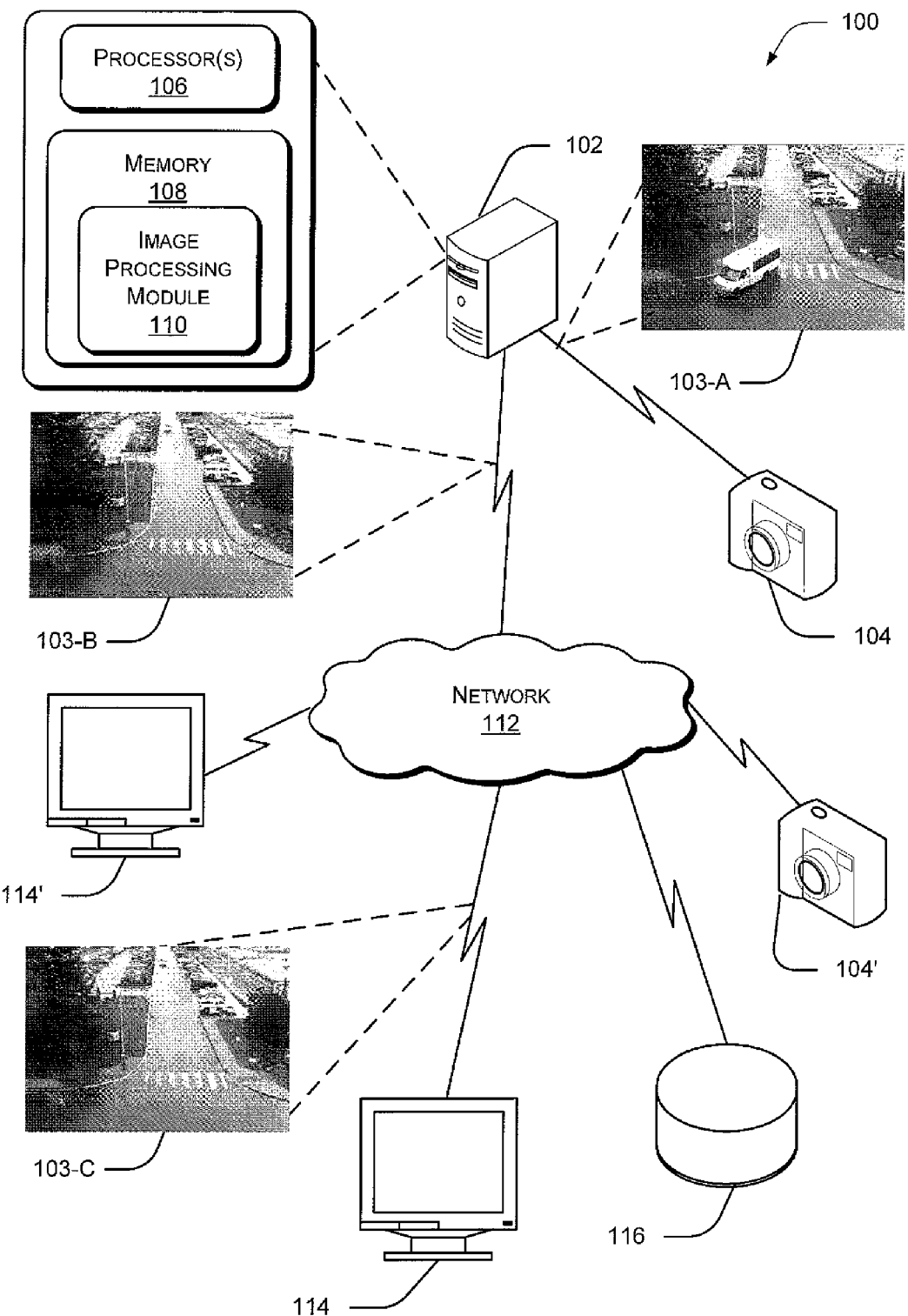
FIG. 1 is an illustration of an exemplary system that includes a computing device for pixel extraction and replacement.

Exemplary System:

FIG. 1 shows an exemplary system 100 for pixel extraction and replacement. The system 100 includes a computing device 102 in communication with a camera 104. The communication link may be via a network, a cable, a wireless link, etc., and use available communication equipment (e.g., network card, wireless circuitry, satellite, etc.). The computing device 102 may be, for example, a server, a desktop PC, a notebook or portable computer, a workstation, a mainframe computer, a mobile computing device, an entertainment device, a game console, a set-top box, a DVD player, an Internet appliance, etc. In the example of FIG. 1, the computing device 102 receives image data, which may be video data, streaming video data, etc.

The computing device 102 includes one or more processors 106 coupled to memory 108. Such processors could be for example, microprocessors, microcomputers, microcontrollers, digital signal processors, central processing units, state machines, logic circuitries, and/or any devices that manipulate data based on operational instructions. In the example of FIG. 1, the processor 106 can fetch and execute computer-program instructions stored in the memory 108. The memory 108 includes computer-readable media in the form of volatile memory, such as Random Access Memory (RAM) and/or non-volatile memory, such as Read Only Memory (ROM) or flash RAM or a combination thereof.

The camera or "cam" 104 may be installed at a place to capture a scene of interest as a video stream. For example, in an implementation, the camera 104 may be installed at a highway to monitor vehicles where a stream is transmitted to a central control office of a highway or police department. In the example of FIG. 1, the camera 104 captures digital images corresponding to the scene of interest, one of which is shown, by way of example, as image 103-A. The camera 104 may be, for example, a CCTV camera, a digital camera, a Webcam, a surveillance camera, or the like, capable of capturing live video and/or discrete images. In an implementation, the computing device 102 can select a scene of interest based on a user input. For example, this may be accomplished by manipulating the camera's orientation by providing user input (e.g., pan, zoom, tilt, other movement, etc.).

The digital image 103-A may be stored in the camera 104 or may be received by the computing device 102 via a communication link to the camera 104. In an embodiment, the computing device 102 receives and stores the digital image 103-A. It may be appreciated that the camera 104 can provide a series of digital images corresponding to a scene of interest.

In an implementation, the memory 108 in the computing device 102 is a storage medium for a series of digital images captured by the camera 104. Further processing of the digital images may be carried out by an image processing module 110, for example, shown as stored in memory 108. Accordingly the image processing module 110 may process the digital image 103-A and generate information for purposes of security control. In the example of FIG. 1, the image processing module 110 determines whether a series of digital images is received in frames, if appropriate. Accordingly, if required, the image processing module 110 may proceed with frame generation.

In an exemplary implementation, the image processing module 110 extracts pixel information and generates a set of pixel values and pixel value frequencies for each pixel presented in the series of digital images (e.g., including an image such as the image 103-A). For purpose of description, pixel value frequency represents a count of occurrences of a pixel value corresponding to a pixel that appears in a series of images (i.e., frequency of occurrence of a value for a particular pixel in a series of images). The image processing module 110 may create a pixel value histogram that represents a set of pixel values and pixel value frequencies for a digital image. It may be appreciated that such a set of pixel values and pixel value frequencies may be stored in data structures in any of a variety of forms. For example, the image processing module 110 may generate and maintain a 2-Dimensional array or table for representation of the set of pixel values and the pixel value frequencies.

In a successive progression, the image processing module 110 may receive a series of individual digital images of a scene of interest. In general, each subsequent digital image includes a pixel value for a particular pixel or pixels. For example, if an image has a resolution of 128 by 128 pixels, a particular pixel of interest may be assigned a location [100, 50] in a 2-D array ranging from 0 to 127 in the coordinate axes (e.g., corners [0, 0], [0, 127], [127, 0] and [127, 127]). Depending on the type of image, the pixel value may have more than one number or associated characteristic. For example, a pixel value of black-and-white image may simply have an intensity value while a pixel in a color image may have individual values for red, green and blue (RGB) or for other color standards along with an intensity or other value(s). In general, an exemplary method can use any of a variety of characteristics of a pixel as a basis for comparison and/or other operations.

In one of the configurations, the image processing module 110 compares a pixel value in a subsequent digital image with a generated set of pixel values. The pixel value frequency of the corresponding pixel is updated if the pixel value belongs to the generated set of pixel values (e.g., pixel value bin count is increased by one). In a case, when no match is found, the pixel value may be included in the generated set of pixel values based upon the comparison (e.g., addition of a new pixel value bin). Of course, as described herein, the pixel value may be replaced if the value does not correspond to a value within the set of pixel values.

For example, in an exemplary embodiment, the image processing module 110 substitutes the pixel value in the subsequent digital image with a pixel value from the set of pixel values or another appropriate pixel value (e.g., predetermined value or average value, etc.). Such a substitution may provide an effect, when viewed, as if no change had occurred in a pixel value for a particular pixel compared to a preferred pixel value. For example, the image processing module 110 provides an output digital image 103-B which may be viewed thereafter. The output digital image 103-B is stored in the computing device 102. In one of the embodiments, the pixel value for the pixel is selected from a generated set on the basis of pixel value frequency. In such an embodiment, the image processing module 110 selects the pixel value with highest frequency for substitution. The pixel value with highest frequency may represent the most preferred pixel value for the pixel (e.g., a commonly occurring "background" value for the particular pixel).

In yet another embodiment, the computing device 102 communicates with other similar computing devices through a network 112. The network 112 may be a wireless or a wired network, or a combination thereof. The network 112 may also be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). For example, the computing device 102 may be connected to computing devices 114 and 114' through the network 112 as shown in the FIG. 1. In such an implementation, the computing device 114 or 114' may receive a series of digital images 103 of a scene from the camera 104. The computing devices 114 and 114' performs similar processing as described above in conjunction with computing device 102. In yet another embodiment, the computing device 114, and 114' receive a processed output digital image 103-C.

In another aspect of the system, a camera 104' may be in communication with one or more of the computing devices 102, 114, and 114' through the network 112. In an alternative embodiment, a series of digital images may be stored in a remote storage 116 and may be retrieved by one or more of the computing devices 102, 114, and 114' for further processing. Such remote storage 116 includes, for example, one or more combination(s) of volatile memory (e.g., RAM) and non-volatile memory (e.g., ROM, Flash etc.).

In another example, a camera may include a processor, memory and instructions (e.g., firmware and/or other software) to implement all or part of the image processing module 110. For example, a camera may include a feature for selecting a security mode that implements the module 110. Such a camera may allow a user to define one or more regions and to assign security levels or other security attributes to the one or more regions.

Figure 2:
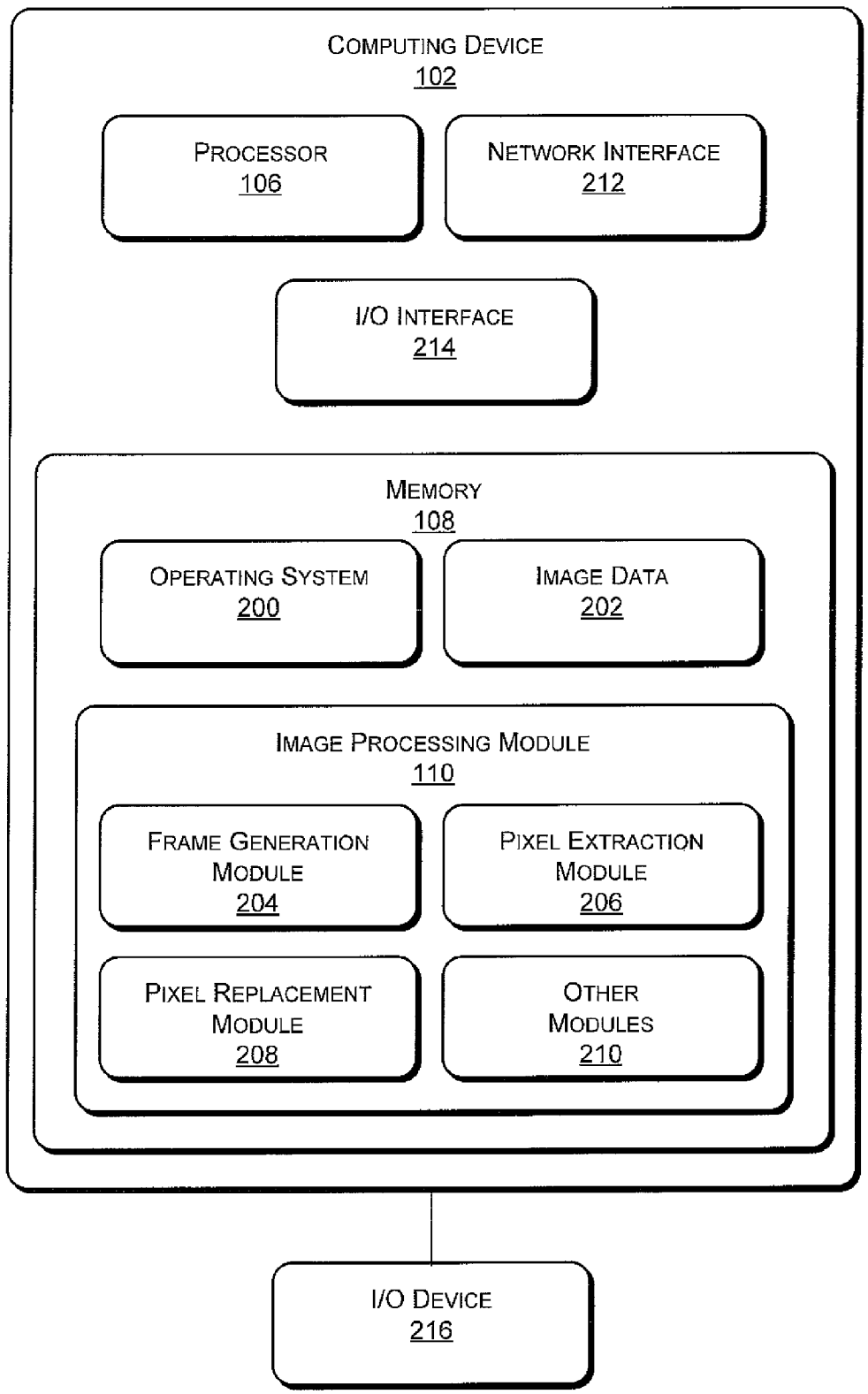
FIG. 2 is an implementation of a computing device for pixel extraction and replacement.

Exemplary Computing Device:

FIG. 2 shows an implementation of the computing device 102 for use in pixel extraction and replacement. To this end, the computing device includes one or more processors 106 coupled to a memory 108.

In the exemplary implementation of FIG. 2, the memory 108 includes an operating system 200 and image data 202. The operating system 200 provides a platform for execution of one or more applications on the computing device 102. The image data 202 includes a series of digital images received from a source. In alternative embodiments, a source of digital images may be one of the cameras 104 or 104' or a remote storage device 116. It may be appreciated that the digital images after being processed by the image processing module 110, get stored in the image data 202. In an alternative embodiment, the memory 108 stores the image data 202 with other data that may be utilized by the pixel extraction module 206 and pixel replacement module 208. Such other data may include, for example, look up tables for threshold values, noise compensation, pixel value histogram, etc.

The memory 108 further includes an image processing module 110 for processing required for pixel extraction and replacement. In the exemplary embodiment, the image processing module 110 includes a frame generation module 204 to generate image frames from a video stream of a scene or from a series of digital images. In a case where a series of digital images are received in frames, frame generation may not be required and the image processing module 110 may proceed with generation of the set of pixel values and pixel value frequencies.

The image processing module 110 further includes a pixel extraction module 206 for extracting pixel information from a series of digital images of a scene. According to an embodiment, the pixel extraction module 206 generates a set of pixel values and pixel value frequencies for a pixel in, for example, the digital image represented as 103-A in FIG. 1. In an alternative embodiment, the pixel extraction module 206 generates and maintains a pixel value histogram, i.e., a histogram of pixel value counts for pixel value bins. The manner in which the pixel extraction module functions is described in detail with reference to FIG. 3. In yet another implementation, the set of pixel values and pixel value frequencies is updated by the pixel extraction module 206 based on pixel values in the subsequent digital image of the scene. In an exemplary implementation, the pixel extraction module 206 compares the pixel value in the subsequent digital image with the generated set of pixel values. The pixel value frequency of the corresponding pixel is updated if the pixel value belongs to the generated set of pixel values. In a case, where a comparison finds no match, the pixel value may be included in the set of pixel values. While a set may count or maintain frequencies for single values (e.g., a bin for 100, a bin for 101, a bin for 102, etc.), a set may count or maintain frequencies for a range of values (e.g. a bin for 100-102, a bin for 103-105, a bin for 106-108, etc.). Where a pixel value falls within a given range, then the frequency may be adjusted accordingly.

In the example of FIG. 2, the image processing module 110 includes a pixel replacement module 208. In an implementation, the pixel replacement module 208 substitutes a pixel value in a subsequent digital image based upon a comparison. Such a subsequent digital image includes a pixel value for each of the pixels presented in an earlier digital image. Accordingly, the pixel replacement module 208 determines whether or not to substitute the pixel value in the subsequent digital image. In such a configuration, the pixel replacement module 208 utilizes the most frequent pixel value in the set of pixel values for purposes of substitution. In another embodiment, the computing device 102 includes other modules 210 which may include, for example, color conversion codes, color space information, gamma correction codes and, other similar softwares etc. The other modules 210 may also include graphics engine for rendering of digital images that complement the image processing module 110 for processing of digital images of a scene.

In yet another configuration, the computing device 102 includes a network interface 212 to enable communication to other similar computing devices 114 and 114'. In such a configuration, the series of digital images of the scene (e.g., images 103-A, 103-B and 103-C) may be processed by the computing devices 114 or 114'. In yet another embodiment, an input/output (I/O) interface 214 exposes capabilities of the system 102 to a user. A user may configure the image processing module 110 by providing inputs through an input/output device 216. A user, in such an embodiment, may provide input commands to set or modify parameters of the pixel extraction module 206. Such parameters may include, for example, threshold values for different camera models, noise compensation factors, light compensation factors, etc.

In an exemplary implementation, a user may select a mode from a plurality of modes including: an initializing mode and an observing mode. An initializing mode refers to generation and updating phase of a pixel value histogram for a pixel in a digital image of a scene. Accordingly, in an initializing mode of the computing device 102, the generation and updating of a set of pixel values and pixel value frequencies takes place. An observing mode refers to detection and substitution of a new pixel value in a subsequent digital image of a scene. In an alternative embodiment, the user may configure the image processing module 110 to automatically switch between the two modes or allow the two modes to be executed in parallel.

Figure 3A:
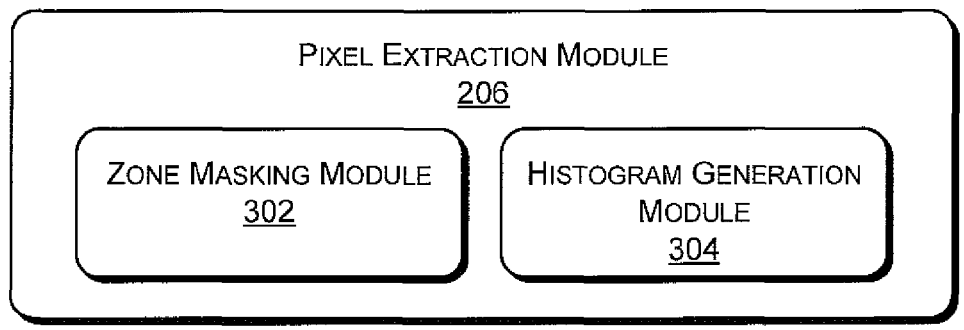
FIGS. 3A and 3B illustrate exemplary embodiments of a pixel extraction module and a histogram generation module, respectively.

Exemplary Pixel Extraction Module:

FIG. 3A shows an exemplary pixel extraction module 206 according to one of the implementations. Appropriately, the pixel extraction module 206 includes a zone masking module 302 and a histogram generation module 304. The zone masking module 302 enables selection of one or more protected regions in a digital image (e.g., the digital image 103-A), over which any of a variety of methods for pixel extraction and replacement may be applied. In an implementation, the zone masking module 302 is user configurable where the user may define sensitive portions of a digital image.

In an exemplary implementation, the zone masking module 302 sets an entire image as a protected region. Thereafter, the user may describe a set of arbitrary shaped regions over which a further stage of processing may be applied. By way of example, a user may select a region or a zone in an image frame (corresponding to a digital image, e.g. 103-A) thereby enabling the user to selectively view or broadcast a region of interest. A region of interest may correspond to non-sensitive objects or portions of a series of a digital image. For purpose of an exemplary illustration, an object refers to an element constituting a scene. An object may be sensitive if the object represents information which, if shared, may lead to an invasion of privacy. The object may be non-sensitive if it represents information which the user has a right to share and wishes to share with others. For illustration purposes, a user may select a region of a digital image which is sensitive, for example, a neighbor's garage, a neighbor's house, a window, an entrance to a business, etc. Such regions have been referred to as protected regions or masked zones in the description. An exemplary illustration of such a selection is explained in detail with reference to FIG. 11 (see below). In one of the embodiments, a protected region may be selected automatically by the zone masking module 302.

Furthermore, the histogram generation module 304 generates a pixel value histogram representing a set of pixel values and pixel value frequencies for a pixel. In an embodiment, the histograms are generated for pixels presented in a series of digital images 103. The histogram generation module 304 stores the pixel value histograms in image data 202. Alternatively, generation of a pixel value histogram may be restricted to pixels of protected regions or masked zones in a digital image as selected by the zone masking module 302. In such an embodiment, the pixel extraction and replacement methods are applied to pixels in the protected region only and not on the digital image as a whole. In an initializing mode of the computing device 102, the histogram generation module 304 detects a new pixel value in subsequent digital images pertaining to a scene of interest. Upon such detection, the histogram generation module 304 compares the new pixel value with a set of pixel values in a pixel value histogram. In yet another implementation, the histogram generation module 304 updates a pixel value histogram based on a comparison between a new pixel value and a set of pixel values in the pixel value histogram.

Figure 3B:
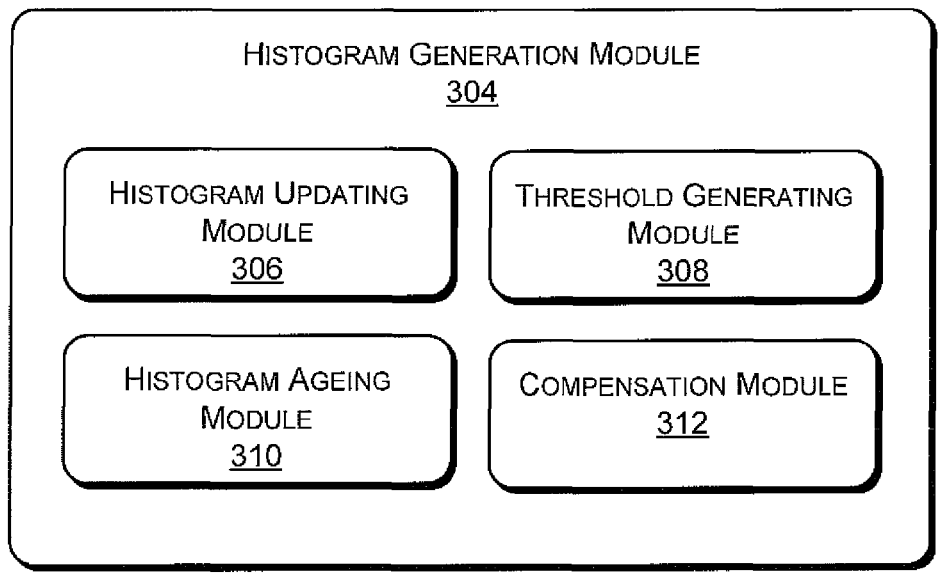

FIG. 3B illustrates an exemplary histogram generation module 304 according to one of the embodiments. Accordingly, the histogram generation module 304 comprises a histogram updating module 306, a threshold generating module 308, a histogram ageing module 310, and a compensation module 312.

In an exemplary implementation, the histogram updating module 306 updates a pixel value histogram generated by the histogram generation module 304. This may be accomplished by comparing pixel value in subsequent digital images of a scene, with pixel values in the pixel value histogram. In an embodiment, an average pixel value in the pixel value histogram is compared with a pixel value in subsequent digital images.

In an implementation, a comparison is performed by computing Euclidian distance between two pixel values. The comparison finds a match when the Euclidian distance is less than a threshold. Conversely, it may be inferred that a new pixel value has been discovered during the comparison if the Euclidian distance is greater than a threshold. A pixel value histogram may be updated to include a new value to expand the pixel value histogram. In a case where the comparison finds a match, a pixel value frequency of a corresponding pixel is updated in the pixel value histogram.

A threshold generation module 308 automatically generates a threshold for a comparison carried out by the histogram updating module 306. In one of the implementations, a threshold may be set by a user by an I/O device 216. By way of example, a user may set a low threshold value for greater accuracy which results in an improvement in the perceptual appeal of a digital image.

In an exemplary implementation, the histogram generation module 304 further includes a histogram ageing module 310 which modifies a pixel value histogram to reflect changes in transient parameters of the surroundings of a camera 104. The transient parameters include, for example, light conditions, sunlight, surrounding interfering signals, etc. For instance, the histogram ageing module 310 generates a light compensation factor (L) to prevent the ageing of a pixel value histogram generated by the histogram generation module 304. To this end, the histogram ageing module 310 generates and maintains a look up table for light intensity value (I) and a corresponding light compensation factor (L). Such a look up table has been illustrated in FIG. 6A. Accordingly, the histogram generation module 304 utilizes the look table for modification of a pixel value histogram to reflect changes in light conditions during the day. This is accomplished by reducing pixel value frequencies in the pixel value histogram by a light compensation factor (L). This enables the image processing module 110 to process digital images during different times of the day without compromising on the quality of image generated as output.

The histogram generation module 304 further includes a compensation module 312 to compensate for a difference in performance characteristics of different models of cameras 104. It is well known that various cameras models (e.g. 104, 104') may have different characteristics, for example, noise filtering, resolution, image processing power, adaptability to changing background conditions, etc. The compensation module 312 takes these characteristics into account while generating and maintaining a pixel value histogram. By way of example, the compensation module 312 may include a look up table for noise compensation associated with various models of camera 104 and 104'. Such a look up table has been illustrated in FIG. 6B. Accordingly, the look up table may include a noise compensation factor K corresponding to different models of camera 104. The noise compensation factor may be utilized to generate a modified threshold and hence a more accurate histogram.

Figure 4A:
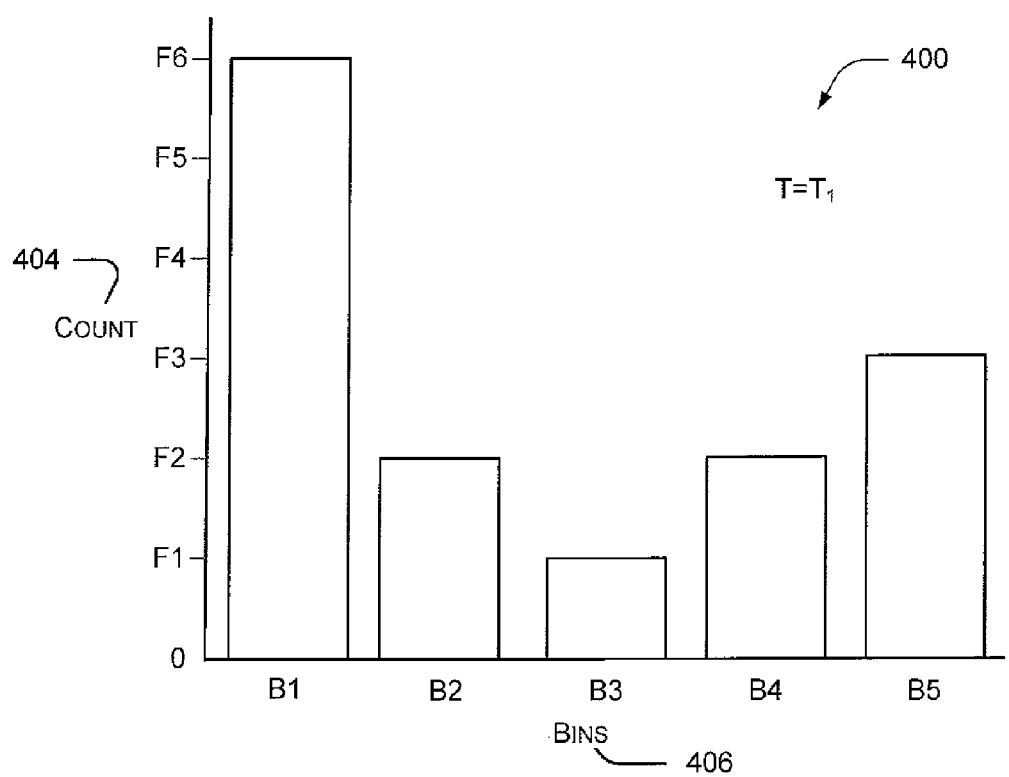
FIGS. 4A and 4B shows exemplary pixel value histograms at time instances, $T=T_1$ and $T=T_1+\Delta$ respectively.
Figure 4B:
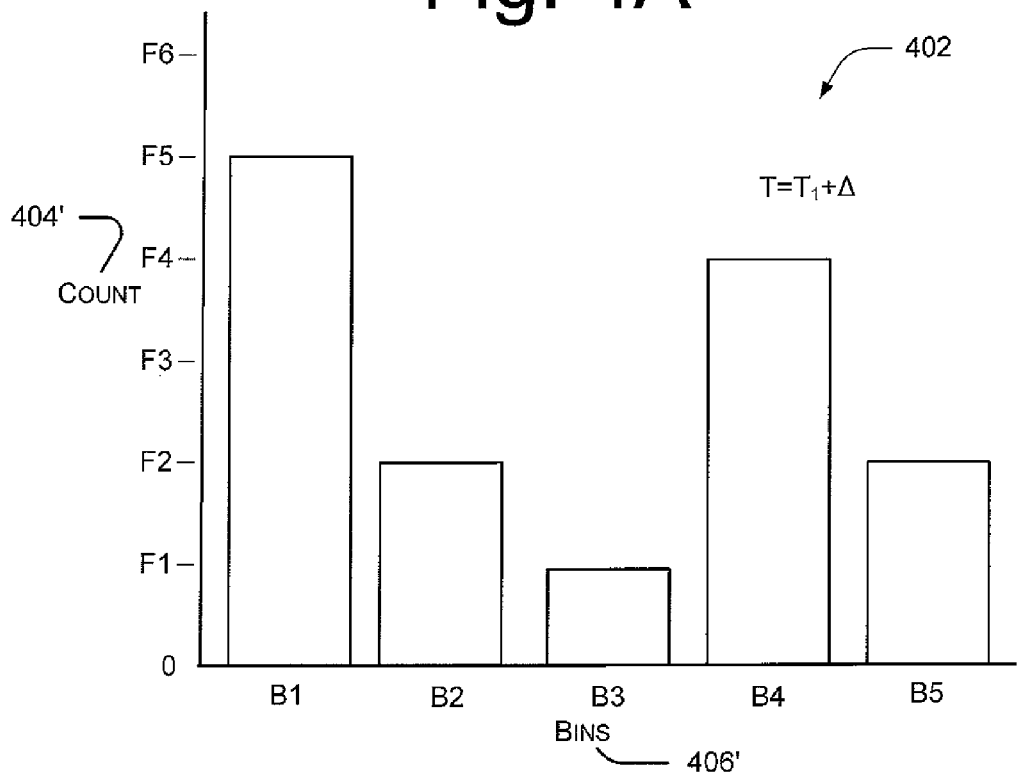

Exemplary Pixel Value Histogram:

FIGS. 4A and 4B illustrate exemplary pixel value histograms 400 and 402 at time instances $T=T_1$ and $T=T_1+\Delta$ respectively for a pixel according to an embodiment. The pixel value histogram 400 includes pixel value frequencies represented as counts 404 and a set of pixel values represented as bins 406. A count 404 may be an integer value corresponding to pixel value frequencies F1, F2, F3, F4, F5, and F6, etc. A bin 406, on the other hand, may be a pixel value represented as B1, B2, B3, B4, and B5, etc. Although only six values of pixel value frequencies (count 404) are shown, it may be appreciated that any number of values may be included. Similarly any number of pixel values may be included to represent bins 406, also consider the aforementioned ranges of values as alternatives to individual value bins. In an embodiment, a pixel value histogram includes at least 4 pixel values or bins. In an implementation, a pixel value histogram 400 may be updated by the histogram updating module 306.

In an implementation, a maximum number of bins may be defined by a user based on a input. In case, when a maximum number of bins have been utilized, and a new pixel value is discovered during an initialization mode of the computing device 102, the histogram updating module 306 excludes a least frequent pixel value from the pixel value histogram 400. For example, the bin B5 may be removed to accommodate a new pixel value discovered by the histogram updating module 306. Furthermore, the bin B1 implies a pixel value having the highest frequency F6. Therefore, in an implementation, the pixel replacement module 208 utilizes B1 for substituting a new pixel value (sensitive) in a subsequent digital image.

FIG. 4B illustrates an updated pixel value histogram 402 for a pixel at time $T=T_1+\Delta$. As shown in the figure, the pixel values and the pixel value frequencies may change over a time interval "$\Delta$". Correspondingly, bins 406' represent an updated set of pixel values and counts 404' represent an updated set of pixel value frequencies. For example, the bin B4 in the pixel value histogram 402 has pixel value frequency F4 as compared to F2 in the pixel value histogram 400. The pixel value histogram 402 also illustrates an implementation, where a maximum of 5 bins is defined by a user. In such a case, during an initialization mode of the computing device 102, a new pixel value will replace the bin B5 in the pixel value histogram 400. Accordingly, a bin B5 in 402 indicates a new pixel value included by the histogram updating module 306. It may also be noted that the bin B5 has a pixel value frequency F2 in the pixel value histogram 402 as compared to the pixel value frequency F3 in pixel value histogram 400. In the above example, the pixel value histogram 400 is updated to reflect an increase in the pixel value frequency of the bin B4 and an inclusion of a new pixel value in bin B5. It may be appreciated that a new pixel value may be included as an additional bin to expand a pixel value histogram if the maximum number of bins is more than 5. Alternatively, the maximum number of bins may be set by a user during an initializing mode of the computing device 102.

Figure 5A:
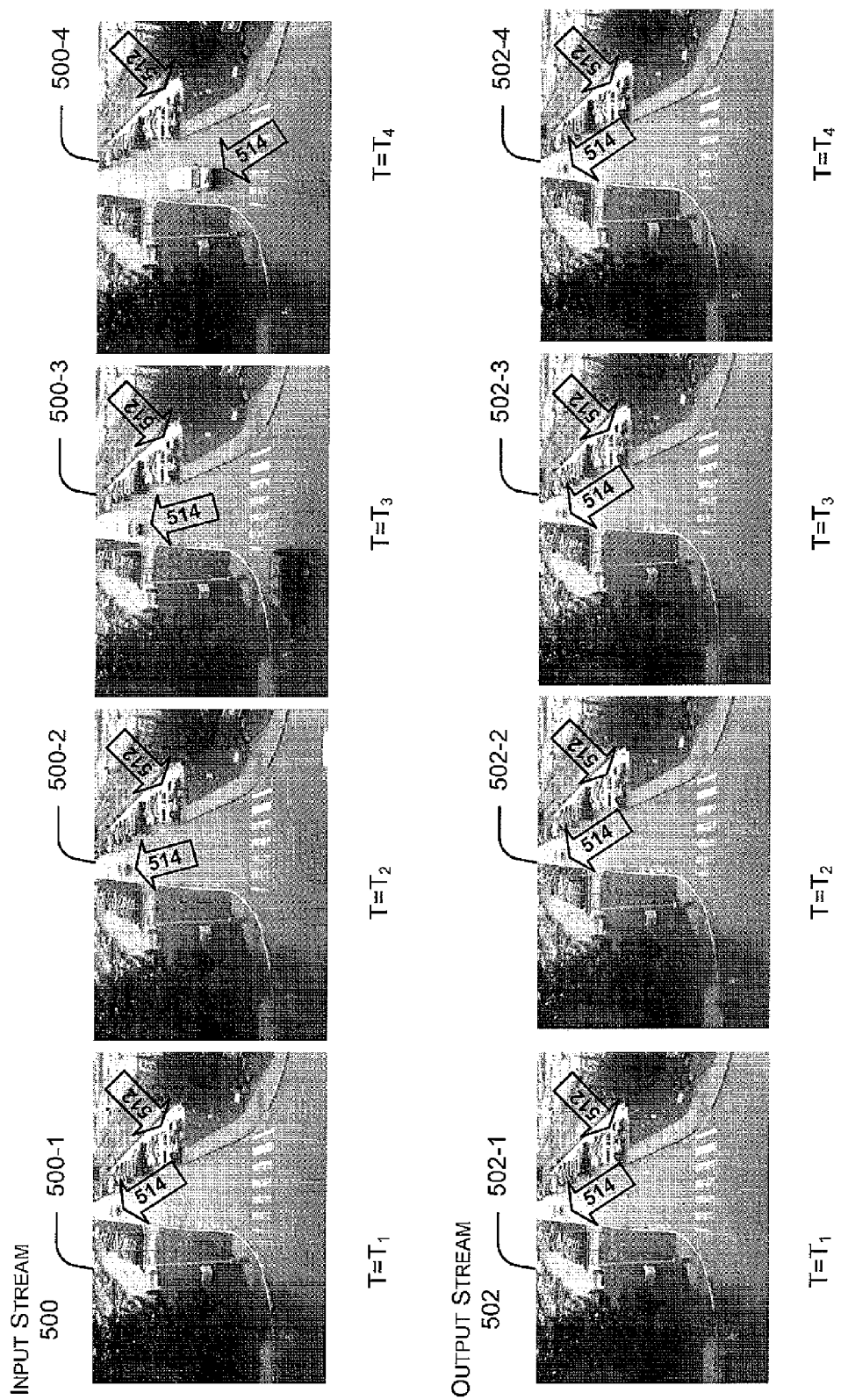
FIGS. 5A and 5B illustrate a series of eight input and output digital images of a scene.
Figure 5B:
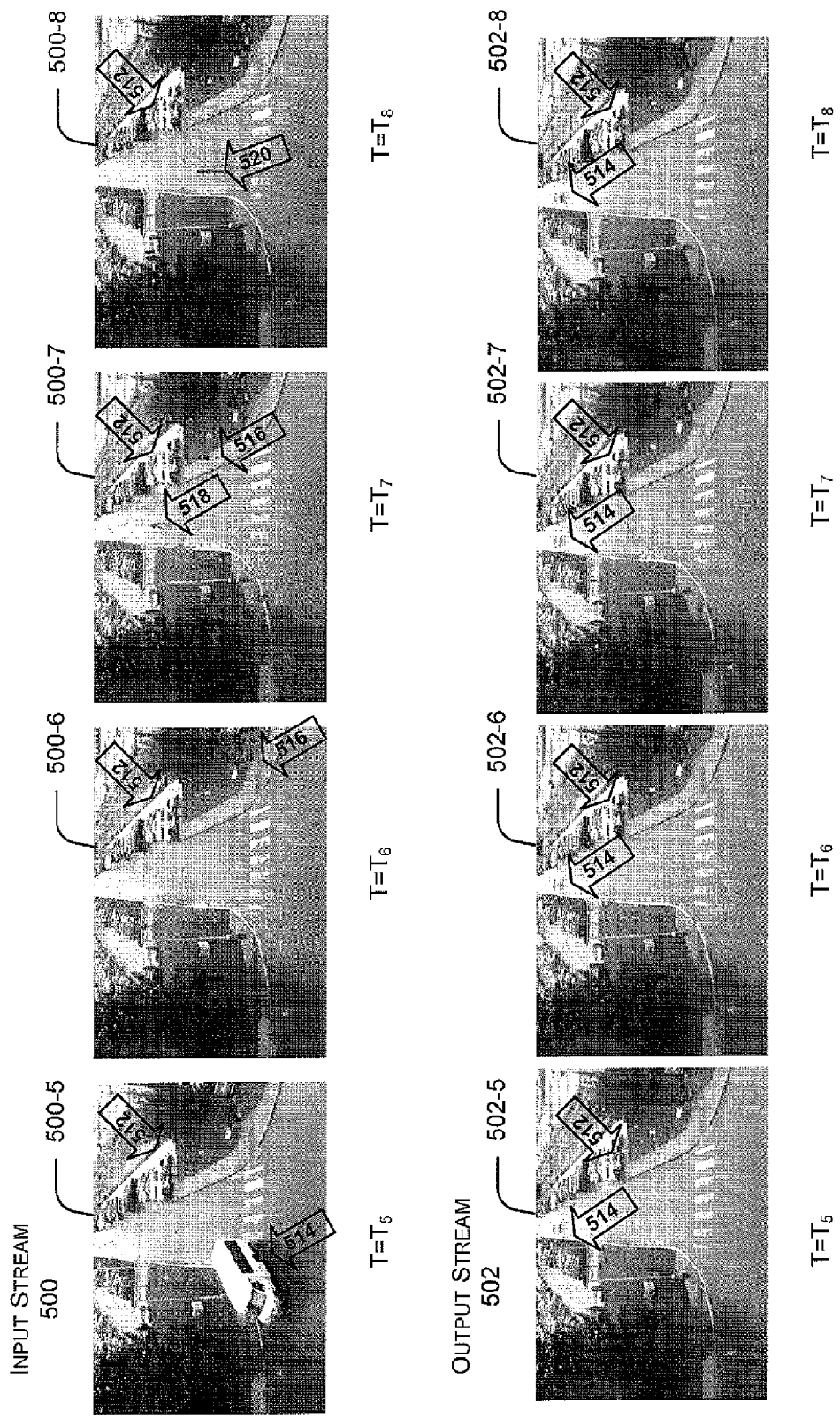

FIGS. 5A and 5B illustrate an input stream 500 and an output stream 502 of eight digital images of a scene of interest. In an example as shown in the figure, a scene of interest is that of a parking lot that may include parked cars, pedestrians, bicyclists, etc., referred to as "parking lot". In the example, it may be desirable to monitor a vehicle 512 in the parking lot scene. To this end, an input stream 500 and an output stream 502 correspond to digital images at time instances $T=T_1$, $T=T_2$, $T=T_3$, $T=T_4$, $T=T_5$, $T=T_6$, $T=T_7$, and $T=T_8$. In an implementation, the input stream 500 represents a series of digital images captured by the camera 104. Correspondingly, the output stream 502 represents a series of processed digital images as outputted by the image processing module 110 in accordance with any of a variety of methods for pixel extraction and replacement as described herein. It may be noted that FIGS. 5A and 5B correspond to processed images in an observing mode of the computing device 102.

For purpose of exemplary illustration, a digital image in the input stream 500 at instant T=T1 is represented as 500-1, at instant T=T2 as 500-2 and so on. Similarly, a digital image in the output stream 502 at instant T=T1 is represented as 502-1, at instant T=T2 as 502-2 and so on. As illustrated in the FIG. 5, the digital image 500-1 includes one or more vehicles 512 and 514. In the exemplary implementation, a protected region in the above example may be selected by a user. Such a protected region may include portions of a digital image that may lead to invasion of privacy. For example, the aisle between parking spaces may be a region or parking spaces may be a region. In the example of FIG. 5, at least a portion of the aisle is a protected region. It may be appreciated that one or more protected regions may be defined for monitoring objects such as the vehicles 512 and 514. In such an implementation, the pixel extraction module 206 generates a set of pixel values and pixel value frequencies for each of the pixels present in a protected region of the image 500-1.

As stated earlier, in one of the implementations, the pixel extraction module 206 may generate a pixel value histogram for each of the pixels presented in a digital image. The digital image 500-1 is similar to a preferred digital image which represents a set of preferred pixel values, as a result of which, a corresponding output digital image 502-1 is unaltered. In an exemplary implementation, the set of preferred pixel values are pixel values included in the pixel value histogram during an initialization mode of the computing device. As may be observed in the digital images 500-2 and 500-3, the vehicle 514 moves toward the camera (e.g. camera 104) (not shown) but corresponding output digital images 502-2 and 502-3 show the vehicle 514 at the same spot as in digital image 500-1. The pixel values representing the vehicle 514 belong to a preferred set of pixel values generated by the pixel extraction module 206. Therefore, the output image shows the vehicle 514 at the same place even when the vehicle moves away or is out of the scene, as illustrated in digital image 502-4 and 502-5.

In the digital image 500-6, a pedestrian 516 moves in the field of view as captured by a camera. A corresponding output digital image 502-6 shows the vehicles 512 and 514 (old position) only and substitutes the pixel value representing the pedestrian 516 by pixel values from a preferred set of pixel values. In an exemplary embodiment, a most frequent pixel value from a preferred set of pixel values may be utilized for such a substitution. Similarly, the digital images 500-7 and 500-8 show new objects 518 (another pedestrian) and 520 (a bicyclist) in addition to the vehicle 516. The vehicles 516, 518 and 520 may be detected and the corresponding pixels may be replaced by the pixel replacement module 208. Accordingly, the output images 502-7 and 502-8 may be generated by the image processing module 110. It may be appreciated that various regions such as the parked car regions adjacent the aisle may be public or non-private and, hence the output stream 502 may any movement in a region corresponding to the vehicle 512. Such a region may therefore correspond to a region of interest or a non-private region for a user monitoring the vehicle 512. The vehicle 514 appears in the output stream 502 because of its inclusion during the generation and updating of a preferred set of pixel values and pixel value frequencies during an initializing mode of the computing device 102. Where appropriate, output images can be generated without inclusion of the vehicle 514.

Figure 6A:
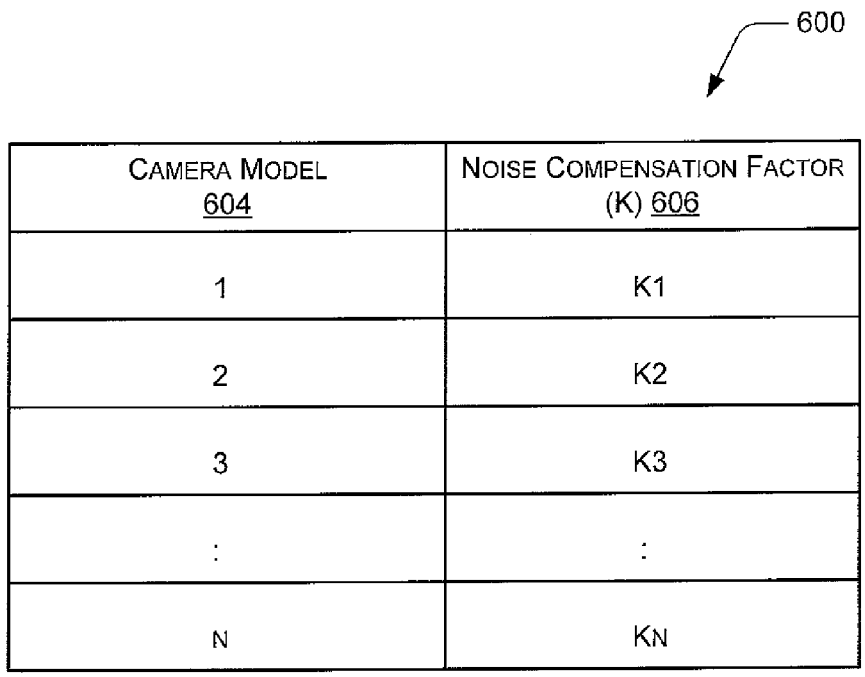
FIG. 6A shows an exemplary look up table for noise compensation for different camera models.

Exemplary Look up Tables for Noise and Light Compensation:

FIG. 6A illustrates an exemplary look up table 600 for noise compensation in different camera models in an embodiment. Accordingly, the look up table 600 includes two fields namely: a field corresponding to camera model 604 and a field corresponding to noise compensation factor (K) 606. The look up table 600 shows a noise compensation factor (K) 606 corresponding to various camera models 604. For example, a camera model 3 has a noise compensation factor K3; a camera model 1 has a noise compensation factor K1, and so on. In an implementation, a look up table 600 may be generated by the compensation module 312 (see FIG. 3B) to take into account differences in performance characteristics of different camera models) 604. In such an implementation, the look up table 600 may be stored in the image data 202 (see FIG. 2).

In another implementation, a look up table 600 may be generated and modified by the compensation module 312 based on commands from a user. The histogram generation module 304 modifies a pixel value histogram based on the look up table 600. In an alternative implementation, the image processing module 110 (see FIG. 1) automatically identifies a camera model 604 and utilizes a corresponding noise compensation factor (K) 606 for generating a pixel value histogram. In such an implementation, a noise compensation factor 606 may be used to modify a threshold generated by the threshold generation module 308. Such modification may include multiplying or dividing the threshold by the noise compensation factor (K) 606. This ensures that the noise characteristics of a camera (e.g. camera 104, 104') do not affect accuracy of a pixel value histogram generated by the histogram generation module 304. In yet another embodiment, the compensation module 312 automatically assesses noise characteristics of a camera due to changing light conditions during different times of a day. In such an embodiment, a look up table may be modified to reflect changes in the noise characteristics of the camera 104.

Figure 6B:
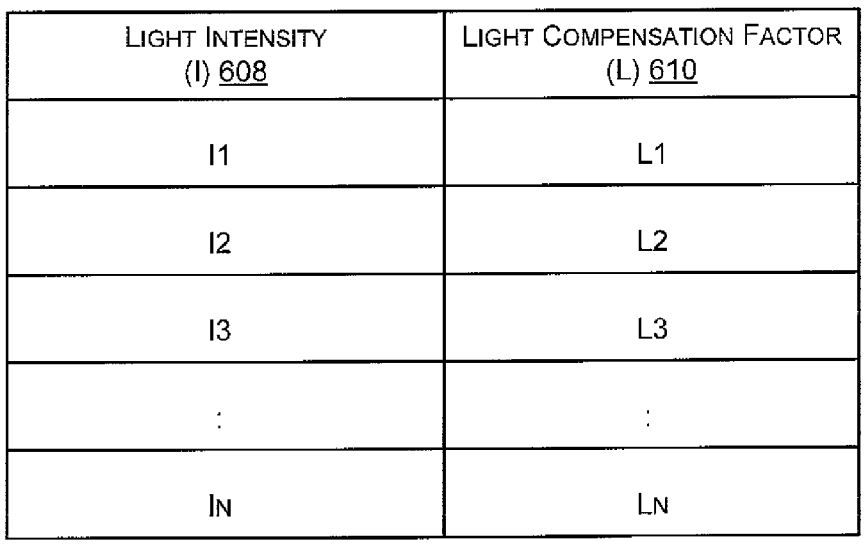
FIG. 6B shows an exemplary look up table for performing image compensation due to a change in lighting.

FIG. 6B illustrates a look up table 602 for compensation of changes in light conditions of surrounding environment of a camera. Accordingly, the look up table 602 includes two fields, namely: light intensity (I) 608 and light compensation factor (L) 610. It may be appreciated that the camera (such as 104 and 104') may employ light sensors known in the art for measuring a light intensity (I) during different time instances of a day. The table 602 shows light compensation factors (L) 610 corresponding to various light intensities (I) 608. For example, an intensity of I2 corresponds to a light compensation factor L2 and so on. In an implementation, a look up table 602 may be generated by the compensation module 312 to take into account varying light conditions of a day. In such an implementation, the look up table 602 may be stored in the image data 202.

In another implementation, a look up table 602 may be generated and modified by the compensation module 312 based on commands from a user. The histogram generation module 304 modifies a pixel value histogram based on a look up table 602. In one of the configurations, the image processing module 110 automatically acquires the light intensity (I) 608 from a sensor in the camera 104. The image processing module 110 utilizes a corresponding light compensation factor (L) 610 while generating and updating a pixel value histogram. In such an implementation, the pixel value histogram is modified based on the light compensation factor 610. Such modifications include multiplying or dividing a set of pixel value frequencies in the pixel value histogram by a light compensation factor 610. This ensures that light conditions around a camera (e.g. camera 104) do not affect the accuracy of a pixel value histogram generated by the histogram generation module 304.

Figure 7:
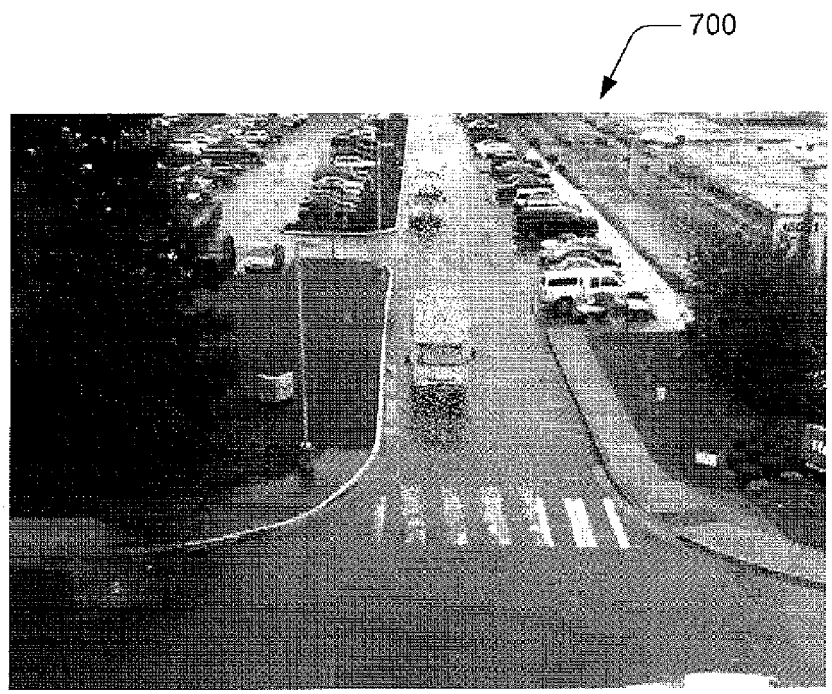
FIG. 7 is an illustration of a digital image formed if the second most frequent pixel value is used as a replacement value, which can yield a less than optimal result.
Figure 7:
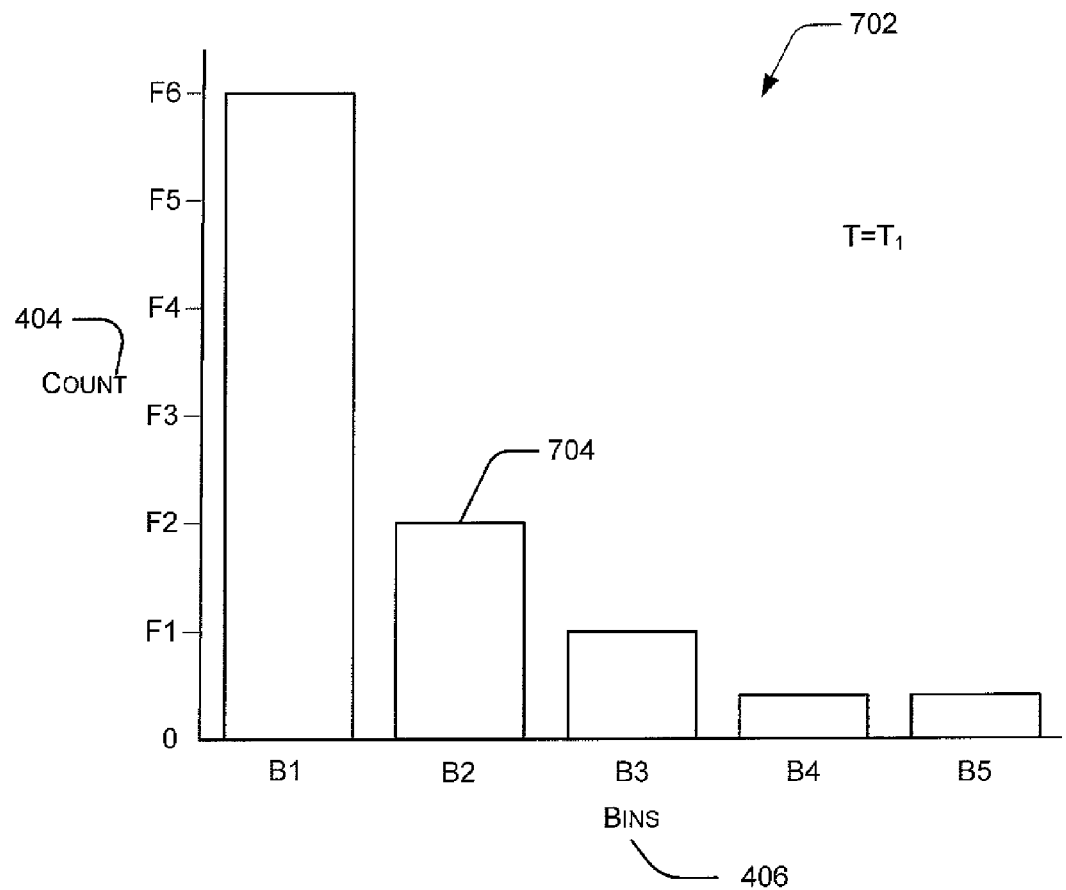

FIG. 7 shows a digital image 700 in an output stream (e.g., stream 502) and a pixel value histogram 702 at time instant T=T₁, utilized for processing of a corresponding digital image in an input stream (e.g., stream 500). It may be appreciated that the digital image 700 corresponds to an output image during an observation mode of the computing device 102. FIG. 7 also illustrates a case when a second most frequent pixel value is utilized by the pixel replacement module 208 for substituting a non-preferred or sensitive pixel in a digital image. As indicated by the histogram 702, a bin B1 corresponds to a pixel value with highest frequency F6, whereas a bin B2 represents a second most frequent pixel value 704 having a frequency F2. The digital image 700 represents the output generated by the image processing module 110 in a case, when the pixel replacement module 208 utilizes the second most pixel value 704 for substitution for each pixel. As shown in the digital image 700, "ghost vehicles" are visible along with parked vehicles (e.g., labeled 512 in FIGS. 5A and 5B), which may lie in a region of interest. It may be inferred from this example that for exemplary purposes of pixel extraction and replacement, a higher pixel value frequency or count 404 ensures a better quality of an output image.

Figure 8:
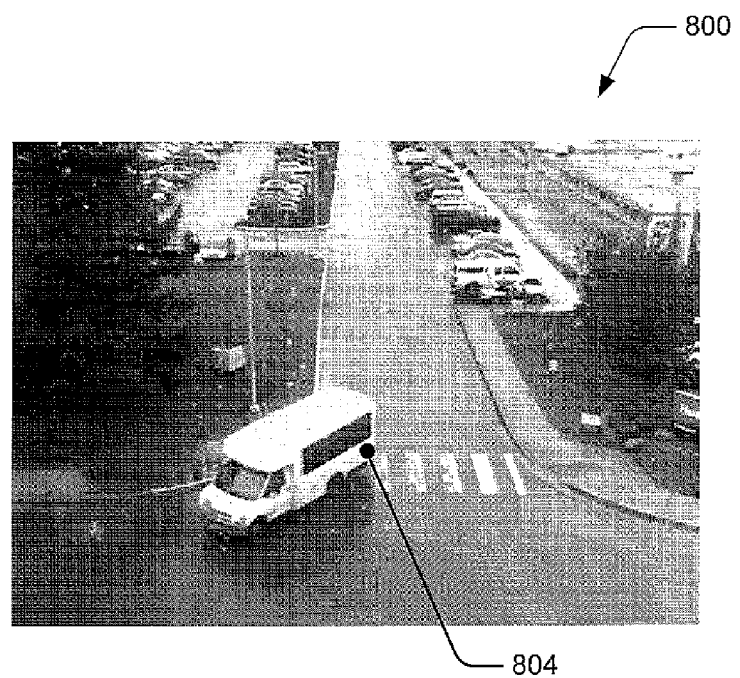
FIG. 8 is an illustration of an exemplary pixel value histogram corresponding to a particular pixel in an image frame.
Figure 8:
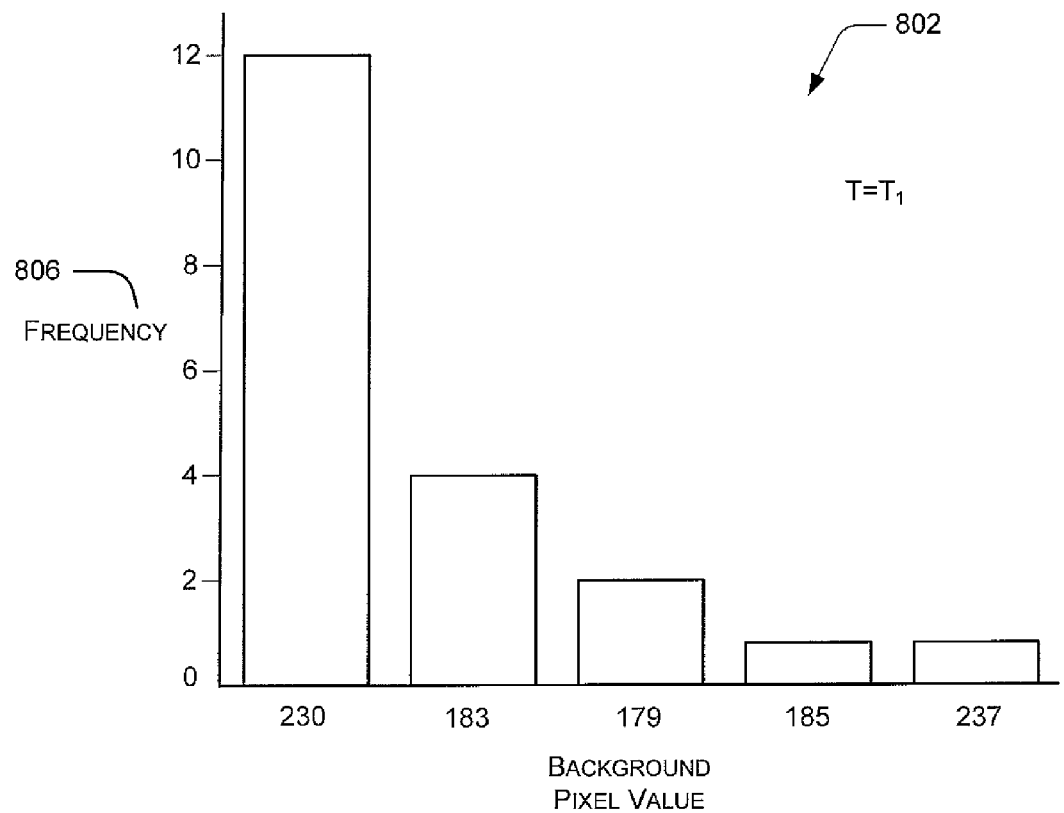

FIG. 8 illustrates a digital image 800 and a pixel value histogram 802 corresponding to a pixel 804 in a digital image 800 in an implementation. The pixel value histogram 802 represents a set of pixel values and pixel value frequencies at time T=T₁. By way of example, a pixel 804 lies in a protected region (sensitive region or masked zone) of the digital image 800 and it may be desirable (in an observation mode of the computing device 102) to replace the pixel 804 with a pixel of a different pixel value (e.g., a preferred pixel value). In such an implementation, the pixel extraction module 206 extracts a pixel value corresponding to the pixel 804. The pixel replacement module 208 compares the extracted value with a set of preferred pixel values in the pixel value histogram 802. As indicated by the histogram 802, pixel value 808 represents preferred pixel values: '230', '183', '179', '185', and '237'. An extracted pixel value of the pixel 804 may be, for example, '161'. Since, '161' does not belong to the preferred set of pixel values in the histogram 802, the pixel replacement module 208 substitutes the value '161' by a value '231'. It may be noted that '231' is the most frequent pixel value 808 in the pixel value histogram 802. Therefore, the digital image 800 represents an output image after replacement of all sensitive pixel values. For purposes of exemplary illustration, sensitive pixels are those pixels that lie in a protected region and have a pixel value not included in a preferred set of pixel values.

Figure 9:
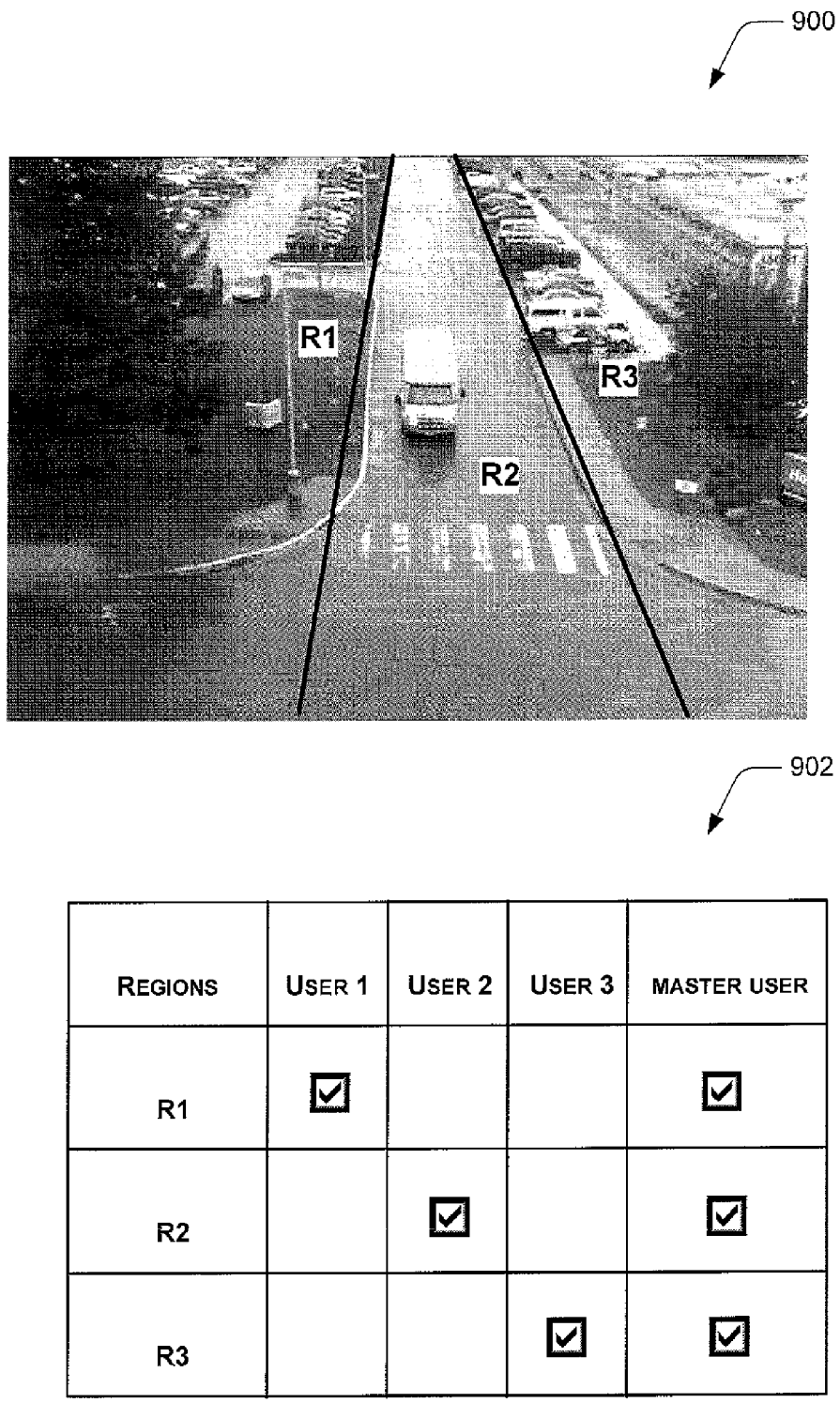
FIG. 9 is an illustration of user defined, protected regions in a digital image and a corresponding user-region table.

FIG. 9 illustrates user defined protected regions in a digital image 900 and a corresponding user-region table 902. Accordingly, the digital image 900 includes three user defined regions R1, R2, and R3. These regions correspond to a region of interest for each of the three users: user1, user2, and user3, respectively. In an implementation, the zone masking module 302 defines one or more protected regions in the digital image 900 during an initialization mode of the computing device 102. To this end, the zone masking module 302 enables selection of a protected region that represents sensitive portion of a digital image. Sensitive portion refers to those regions that a user does not have the right to share with others. Sharing a sensitive portion may lead to invasion of privacy. Therefore, according to the user-region table 902, the region of interest for user1 is R1, for user2 is R2 and, for user3 is R3. This implies that regions R2 and R3 represent protected regions with regard to user1 and so on. It may be noted that the user1 may be monitoring a vehicle shown in the region R1 and hence any information related to the regions R2 and R3 is sensitive as far as user1 is concerned.

In an exemplary implementation, methods of pixel extraction and replacement may be applied to one or more protected regions only. For example, the computing device 102 may performs pixel extraction and replacement only to the protected regions R2 and R3 while generating an output digital image meant for user1. In an alternative embodiment, one or more protected regions may be either automatically defined by the zone masking module 302 or may be defined by a user as in the present case. In yet another embodiment, a master user, or an administrator configures and controls the zone masking module 302. In such an embodiment, a master user may see the whole digital image 900 without any region being protected or masked. A master user may define one or more protected regions (e.g. R1, R2, and R3) for one or more user (user1, user2, and user3). As shown in FIG. 9, a tick mark corresponding to a user and a region implies that the region corresponds to a region of interest for the user. Although, only three regions have been illustrated, it may be appreciated that any number of regions may be defined for the purpose of pixel extraction and replacement.

Exemplary Methods:

Exemplary methods for pixel extraction and replacement are described with reference to FIGS. 1 to 9. These exemplary methods may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 10:
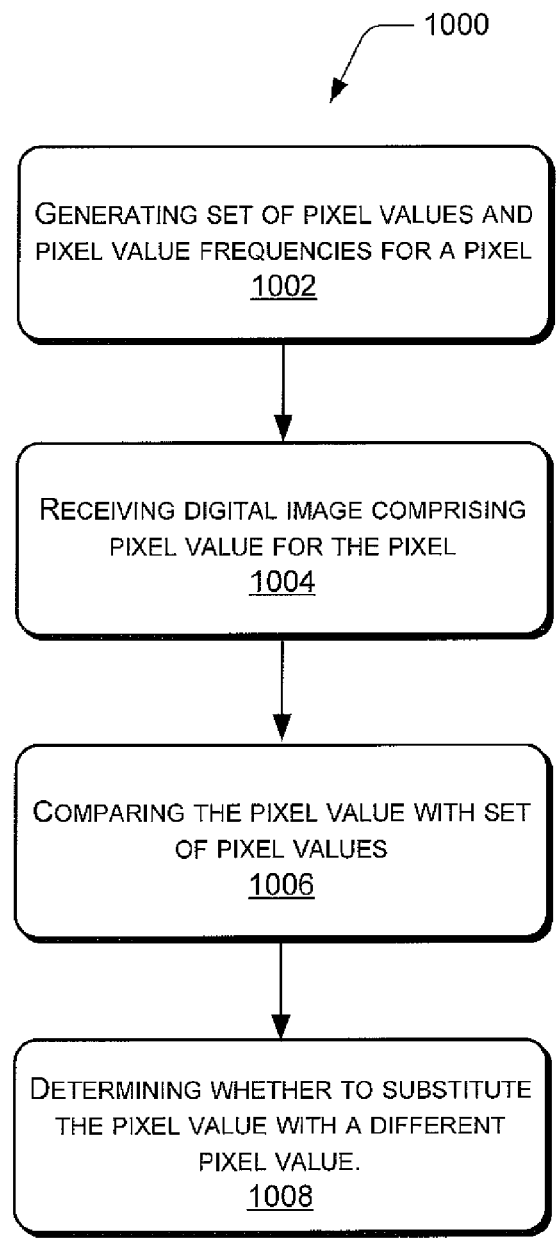
FIG. 10 is an illustration of an exemplary method for pixel extraction and replacement.

FIG. 10 illustrates an exemplary method 1000 for pixel extraction and replacement. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 1002, a set of pixel values and pixel value frequencies for a pixel presented in a series of digital images of a scene are generated. In the exemplary implementation, the pixel extraction module 206 in the computing device 102 extracts pixel information of a pixel presented in a series of digital images 103 to generate a set of pixel values and pixel value frequencies. Such a series of digital images may be provided by a camera (e.g. camera 104, 104') in communication with the computing device 102. In an alternative implementation, the histogram generation module 304 generates and updates a pixel value histogram that represents a set of preferable pixel values and set of pixel value frequencies. Accordingly, the histogram updating module 306 updates the pixel value histogram based on pixel values associated with a series of digital images. In an alternative configuration, the updating of the pixel value histogram includes computing Euclidian distance between average pixel value in a pixel value histogram and subsequent pixel values associated with a series of digital images for a pixel. In such a configuration, the histogram updating module 306 compares the Euclidian distance with a threshold generated by the threshold generation module 308.

At block 1004, a digital image of the scene is received that includes a pixel value for the pixel. In an implementation, the image processing module 110 receives a digital image 103-A. In such an implementation, the pixel extraction module 206 extracts a pixel value of the pixel in the digital image 103-A. In one of the embodiments, the digital image may be received from a camera 104 in communication with the computing device 102.

At block 1006, the pixel value of the pixel received at block 1004 is compared with the set of pixel values and pixel value frequencies generated at block 1002. In an exemplary embodiment, the pixel replacement module 208 compares the pixel value extracted at block 1004 with the set of pixel values generated at block 1002.

At block 1008, substitution of the pixel value extracted at block 1004 by a different pixel value is determined based on the comparison at block 1006. In an exemplary implementation, the pixel replacement module 208, based on the comparison, determines whether to substitute the extracted pixel value in the digital image 103-A with a different pixel value. This determining may be followed by the substitution of the pixel value in 103-A with a pixel value from the preferred set of pixel values or from the pixel value histogram. In an implementation, the pixel value utilized for substitution has the highest pixel value frequency. To substantiate, a most frequent pixel value in the pixel value histogram may be used by the pixel replacement module 208 for substitution.

Figure 11:
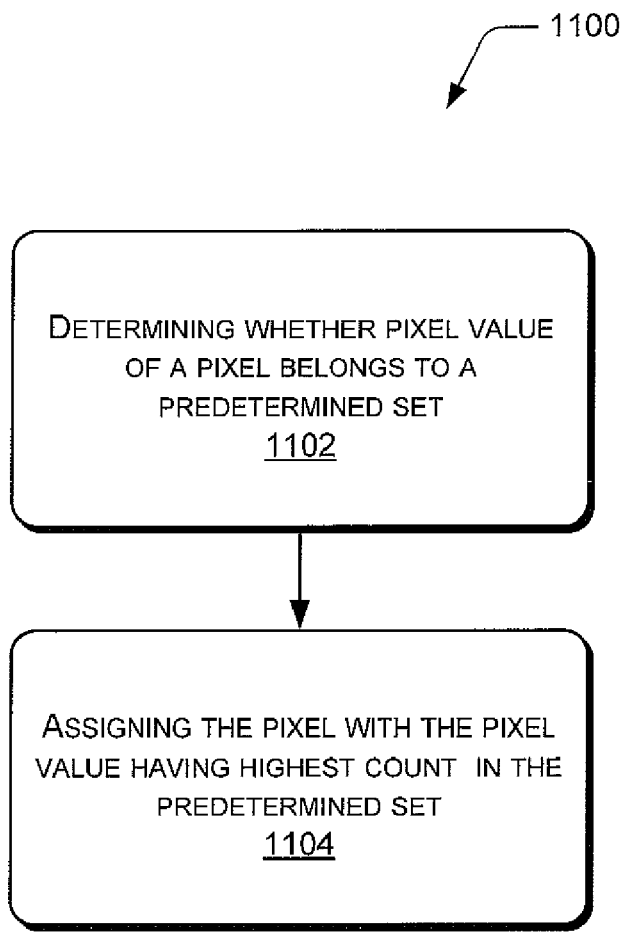
FIG. 11 is an illustration of yet another method for pixel extraction and replacement.

FIG. 11 illustrates another exemplary method 1100 for pixel extraction and replacement. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 1102, it is determined, responsive to receipt of a digital image, whether a pixel value of a pixel in the digital image belongs to a pre-determined set of pixel values. In an exemplary implementation, the image processing module 110 receives a digital image 103-A and determines whether a pixel in the digital image 103-A belongs to a predetermined set of pixel values. In an alternative embodiment, determining further includes generating a pixel value histogram by the histogram generation module 304. In such an implementation, a histogram represents a predetermined set of pixel values and count of occurrences of pixel values for a pixel. In yet another embodiment, receiving of a digital image may be from a camera (e.g. camera 104, 104').

In yet another embodiment, the determining may include comparison of a pixel value in the digital image 103-A with a predetermined set of pixel values. Alternatively, the histogram may be updated by the histogram updating module 306 to include all possible pixel values for the pixel over a period of time. This is performed during an initialization mode of the computing device 102. It may be noted that a pixel value histogram represents a preferred set of pixel values and corresponding pixel value frequencies. Furthermore, in an initialization mode the histogram updating module 306 compares the pixel values corresponding to the pixel in subsequent digital images 103 with the preferred set of pixel values.

In an implementation, the comparison may be performed by computing vector distance between the values being compared. It may be appreciated that for purposes of comparison, methods known in the art may be employed. In one of the configurations, determining includes modifying a pixel value histogram to reflect changes in light conditions and noise associated with a camera, for example, camera 104. In an exemplary implementation, the determining is performed for pixels that lie in a protected region in the digital image 103-A. The image processing module 110 may automatically define such a protected region. In another aspect, a protected region may be defined by a user based on commands issued through the I/O device 216.

At block 1104, the pixel is assigned with the pixel values having a highest count of occurrence in the set of pixel values based on the determining at block 1102. In an exemplary implementation, the image processing module 110 assigns the pixel with one of the pixel values in the predetermined (preferred) set of pixel values based on the determination at block 1102. To substantiate, the assigning takes place only when it is determined that the pixel value does not belong to the predetermined (or preferred) set of pixel values.

Figure 12:
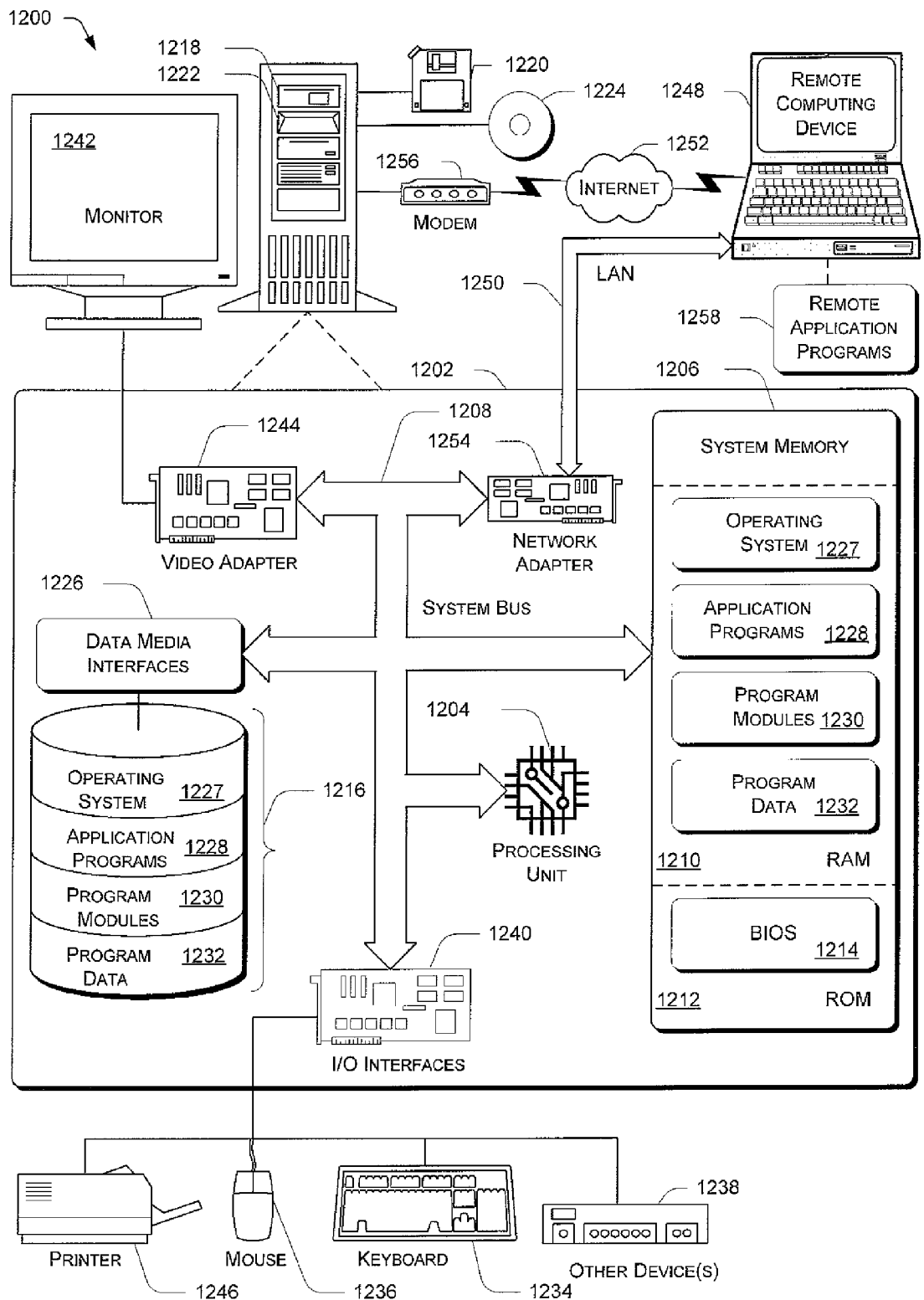
FIG. 12 is an illustration of a general computing environment implementing a system for pixel extraction and replacement.

Exemplary Computer Environment:

FIG. 12 illustrates an exemplary general computer environment 1200, which can be used to implement the techniques described herein, and which may be representative, in whole or in part, of elements described herein. The computer environment 1200 is only one example of a computing environment and is not intended to suggest any limitation as to the scope of use or functionality of the computer and network architectures. Neither should the computer environment 1200 be interpreted as having any dependency or requirement relating to any one or combination of components illustrated in the example computer environment 1200.

Computer environment 1200 includes a general-purpose computing-based device in the form of a computer 1202. Computer 1202 can be, for example, a desktop computer, a handheld computer, a notebook or laptop computer, a server computer, a game console, and so on. The components of computer 1202 can include, but are not limited to, one or more processors or processing units 1204, a system memory 1206, and a system bus 1208 that couples various system components including the processor 1204 to the system memory 1206.

The system bus 1208 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1202 typically includes a variety of computer readable media. Such media can be any available media that is accessible by computer 1202 and includes both volatile and non-volatile media, removable and non-removable media.

The system memory 1206 includes computer readable media in the form of volatile memory, such as random access memory (RAM) 1210, and/or non-volatile memory, such as read only memory (ROM) 1212. A basic input/output system (BIOS) 1214, containing the basic routines that help to transfer information between elements within computer 1202, such as during start-up, is stored in ROM 1212. RAM 1210 typically contains data and/or program modules that are immediately accessible to and/or presently operated on by the processing unit 1204.

Computer 1202 may also include other removable/non-removable, volatile/non-volatile computer storage media. By way of example, FIG. 12 illustrates a hard disk drive 1216 for reading from and writing to a non-removable, non-volatile magnetic media (not shown), a magnetic disk drive 1218 for reading from and writing to a removable, non-volatile magnetic disk 1220 (e.g., a "floppy disk"), and an optical disk drive 1222 for reading from and/or writing to a removable, non-volatile optical disk 1224 such as a CD-ROM, DVD-ROM, or other optical media. The hard disk drive 1216, magnetic disk drive 1218, and optical disk drive 1222 are each connected to the system bus 1208 by one or more data media interfaces 1226. Alternatively, the hard disk drive 1216, magnetic disk drive 1218, and optical disk drive 1222 can be connected to the system bus 1208 by one or more interfaces (not shown).

The disk drives and their associated computer-readable media provide non-volatile storage of computer readable instructions, data structures, program modules, and other data for computer 1202. Although the example illustrates a hard disk 1216, a removable magnetic disk 1220, and a removable optical disk 1224, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1216, magnetic disk 1220, optical disk 1224, ROM 1212, and/or RAM 1210, including by way of example, an operating system 1227, one or more application programs 1228, other program modules 1230, and program data 1232. Each of such operating system 1227, one or more application programs 1228, other program modules 1230, and program data 1232 (or some combination thereof) may implement all or part of the resident components that support the distributed file system.

A user can enter commands and information into computer 1202 via input devices such as a keyboard 1234 and a pointing device 1236 (e.g., a "mouse"). Other input devices 1238 (not shown specifically) may include a microphone, joystick, game pad, satellite dish, serial port, scanner, and/or the like. These and other input devices are connected to the processing unit 1504 via input/output interfaces 1240 that are coupled to the system bus 1208, but may be connected by other interface and bus structures, such as a parallel port, game port, or a universal serial bus (USB).

A monitor 1242 or other type of display device can also be connected to the system bus 1208 via an interface, such as a video adapter 1244. In addition to the monitor 1242, other output peripheral devices can include components such as speakers (not shown) and a printer 1246 which can be connected to computer 1202 via the input/output interfaces 1240.

Computer 1202 can operate in a networked environment using logical connections to one or more remote computers, such as a remote computing-based device 1248. By way of example, the remote computing-based device 1248 can be a personal computer, portable computer, a server, a router, a network computer, a peer device or other common network node, and the like. The remote computing-based device 1248 is illustrated as a portable computer that can include many or all of the elements and features described herein relative to computer 1202.

Logical connections between computer 1202 and the remote computer 1248 are depicted as a local area network (LAN) 1250 and a general wide area network (WAN) 1252. Such networking environments are commonplace in offices, enterprise-wide computer networks, intranets, and the Internet.

When implemented in a LAN networking environment, the computer 1202 is connected to a local network 1250 via a network interface or adapter 1254. When implemented in a WAN networking environment, the computer 1202 typically includes a modem 1256 or other means for establishing communications over the wide network 1252. The modem 1256, which can be internal or external to computer 1202, can be connected to the system bus 1208 via the input/output interfaces 1240 or other appropriate mechanisms. It is to be appreciated that the illustrated network connections are exemplary and that other means of establishing communication link(s) between the computers 1202 and 1248 can be employed.

In a networked environment, such as that illustrated with computing environment 1200, program modules depicted relative to the computer 1202, or portions thereof, may be stored in a remote memory storage device. By way of example, remote application programs 1258 reside on a memory device of remote computer 1248. For purposes of illustration, application programs and other executable program components such as the operating system are illustrated herein as discrete blocks, although it is recognized that such programs and components reside at various times in different storage components of the computing-based device 1202, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

The above-described techniques (e.g., methods, devices, systems, etc.) pertain to pixel extraction and replacement. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method comprising:
defining one or more protected regions of a scene that correspond to one or more sensitive portions within the scene;
determining that a coordinate location representing a pixel within the scene lies within at least one of the one or more protected regions;
receiving a temporal series of digital images of the scene;
generating a set of pixel values and pixel value frequencies for the pixel as the pixel reoccurs at a same coordinate location for each received digital image in the temporal series of digital images;
receiving a subsequent digital image of the scene, wherein the subsequent digital image comprises a subsequent pixel value for the pixel at the same coordinate location within the scene;
comparing the subsequent pixel value with the set of pixel values and pixel value frequencies; and
based on the comparing, determining whether to substitute the subsequent pixel value with a different pixel value.

2. The method of claim 1, wherein the generating comprises creating a pixel value histogram for the pixel, the pixel value histogram representing the set of pixel values and pixel value frequencies.

3. The method of claim 1, further comprising updating the set of pixel values and pixel value frequencies based on the subsequent pixel value.

4. The method of claim 3, wherein updating further comprises computing Euclidian distances between the set of pixel values and the subsequent pixel value.

5. The method of claim 4, wherein updating further comprises comparing the Euclidian distance with a predetermined threshold value.

6. The method of claim 1, wherein the different pixel value corresponds to a highest pixel value frequency in the set of pixel value frequencies.

7. The method of claim 1, wherein the subsequent pixel value is substituted with the different pixel value to mask the one or more sensitive portions within the scene.

8. The method of claim 7, wherein the masking hides movement of a private object associated with the one or more sensitive portions within the scene by utilizing image data previously received in the temporal series of digital images.

9. A system comprising:
one or more processors;
a memory; and
an image processing module configured to:
receive a digital image of a scene;
determine that a coordinate location representing a pixel in the digital image lies within one or more masked regions of the scene that correspond to one or more sensitive portions within the scene;
extract a pixel value for the pixel in the digital image;
compare the pixel value with a set of pixel values previously extracted from a series of previously received digital images of a same scene, the set of pixel values being associated with a count of occurrences of different pixel values extracted at a same coordinate location in each of the previously received digital images; and
assign a substitute pixel value to the coordinate location representing the pixel, the substitute pixel value being a highest count of occurrence pixel value in the set of pixel values.

10. The system of claim 9, wherein the image processing module comprises a pixel extraction module programmed to generate the set of pixel values.

11. The system of claim 10, wherein the pixel extraction module updates the set of pixel values based on the pixel value.

12. The system of claim 9, wherein the image processing module modifies the set of pixel values to reflect changes in light conditions and noise characteristics associated with a camera.

13. The system of claim 9 further comprising an interface configured to enable a user to select the one or more masked regions.

14. One or more computer readable media comprising computer-executable instructions stored thereon, that, when executed by a computer perform acts comprising:
- selecting one or more protected regions of a scene that correspond to one or more sensitive portions within the scene;
- determining that a coordinate location representing a pixel within the scene lies within at least one of the one or more protected regions;
- generating a pixel value histogram for the coordinate location representing the pixel within the scene, the pixel value histogram representing a set of pixel values and pixel value frequencies that occur at a same coordinate location for each digital image in a temporal series of digital images of the scene;
- receiving a subsequent digital image of the scene, wherein the subsequent digital image comprises a subsequent pixel value representing the same coordinate location within the scene;
- comparing the subsequent pixel value to the set of pixel values and pixel value frequencies in the pixel value histogram; and
- based on the comparing, determining whether to substitute the subsequent pixel value with the most frequent pixel value in the pixel value histogram.

15. One or more computer readable media as in claim 14, further comprising updating the pixel value histogram by computing a vector distance between the set of pixel values in the pixel value histogram and the subsequent pixel value.

16. One or more computer readable media as in claim 15, wherein the updating further comprises:
- generating a threshold; and
- comparing the vector distance to the threshold.

17. One or more computer readable media as in claim 14, further comprising modifying the pixel value histogram to reflect changes in light conditions and noise associated with a camera.

18. One or more computer readable media as in claim 14, wherein the one or more protected regions are selected based on user input.

19. One or more computer readable media as in claim 14, wherein the subsequent pixel value is substituted with the most frequent pixel value to mask the one or more sensitive portions within the scene.

20. One or more computer readable media as in claim 19, wherein the masking hides movement of a private object associated with the one or more sensitive portions within the scene by utilizing image data previously received in the temporal series of digital images.

* * * * *